United States Patent [19]

Bennethum

[11] 4,212,615

[45] Jul. 15, 1980

[54] ROTARY DRUM AGGLOMERATING APPARATUS

[75] Inventor: Earl W. Bennethum, Coopersburg, Pa.

[73] Assignee: Bethlehem Steel Corporation, Bethlehem, Pa.

[21] Appl. No.: 832,841

[22] Filed: Sep. 13, 1977

Related U.S. Application Data

[63] Continuation-in-part of Ser. No. 672,373, Mar. 31, 1976, abandoned.

[51] Int. Cl.² .......................... C10B 1/10; C22B 1/16; C22B 1/216
[52] U.S. Cl. ............................................ 425/222; 75/3; 202/216; 366/221; 425/332; 432/118
[58] Field of Search ........ 23/313 R, 313 AS, 313 FB, 23/314; 425/222, 332; 264/117; 75/3; 366/221; 202/100, 131, 136, 216; 432/118

[56] References Cited

U.S. PATENT DOCUMENTS

| | | | |
|---|---|---|---|
| 1,980,130 | 11/1934 | Fasting | 23/313 R |
| 2,243,384 | 5/1941 | Lehrecke | 23/313 R |
| 2,920,344 | 1/1960 | Stirling | 23/313 R |
| 2,984,861 | 5/1961 | Cox et al. | 425/222 |
| 3,161,707 | 12/1964 | Stirling | 264/117 |
| 3,988,114 | 10/1976 | Gorin et al. | 23/313 R |

FOREIGN PATENT DOCUMENTS 37-5153  6/1962  Japan ..................... 23/313 R

Primary Examiner—Bradley R. Garris
Attorney, Agent, or Firm—Joseph J. O'Keefe; William B. Noll

[57] ABSTRACT

Agglomerating apparatus in the form of a rotating drum and a method for agglomerating and controlling the size consist of carbonaceous material, such as particulate coal, finely divided char and, optionally, a binder such as pitch. Control of the agglomerate consist size distribution discharged from the drum is achieved by increasing the relative residence time of the small or growing agglomerates and by limiting contact between the large formed agglomerates and the small forming or growing agglomerates. The preferred means to insure adequate growth time for the small agglomerates consists of a plurality of annular ribs spaced about the inside wall of the drum and a cooperating scraping mechanism. The scraping mechanism comprises a plurality of scraper blades projecting radially from a rotating shaft throughout the length thereof of the agglomerate-forming section of the drum. However, at the annular paths wherein a rib is found the scraping blades are shorter in length.

6 Claims, 4 Drawing Figures

U.S. Patent  Jul. 15, 1980  4,212,615
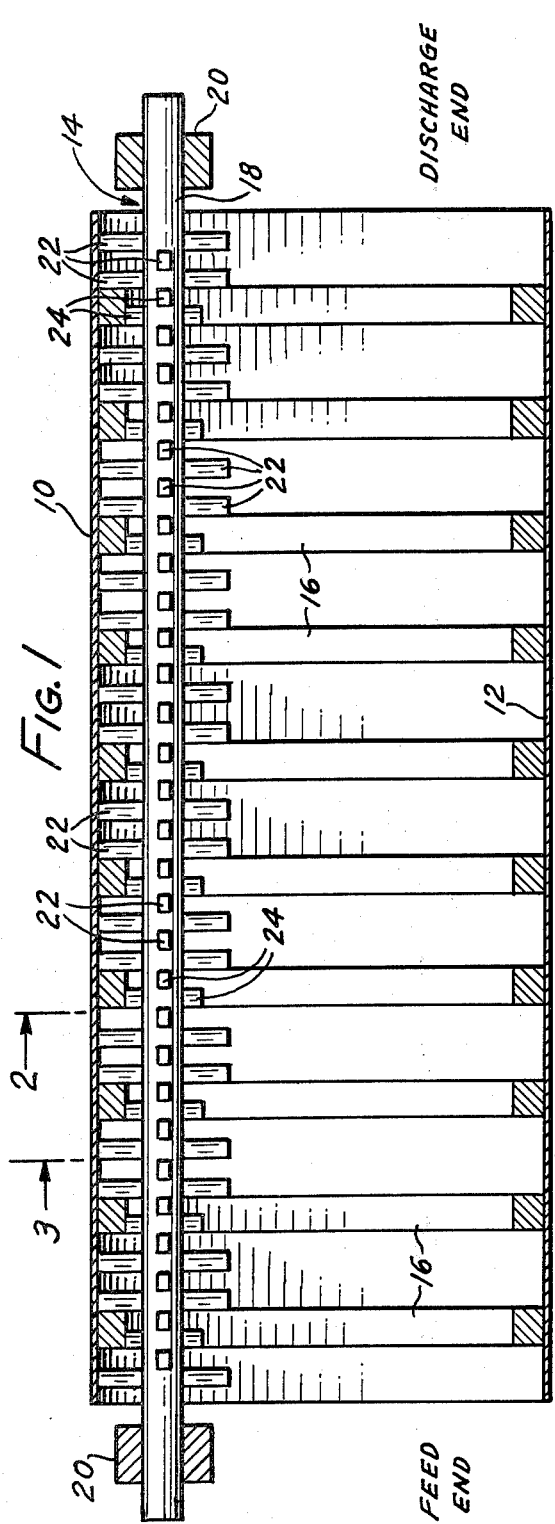
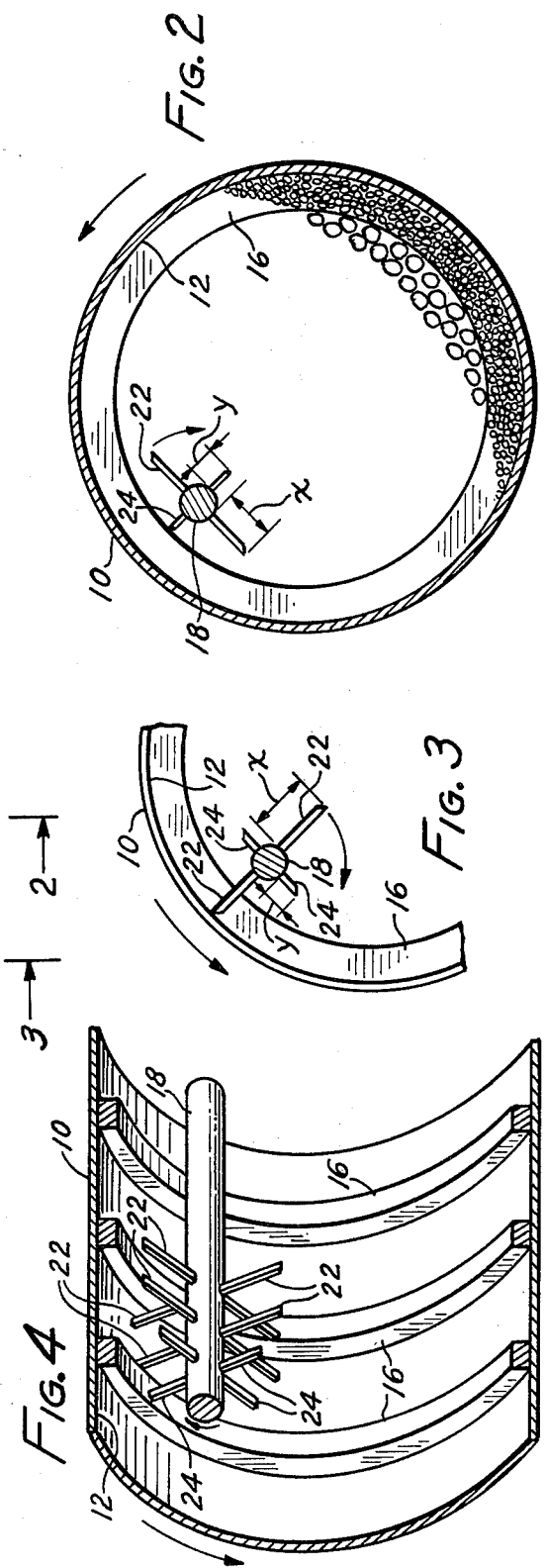

ROTARY DRUM AGGLOMERATING APPARATUS

This is a continuation of application Ser. No. 672,373, filed Mar. 31, 1976, now abandoned.

BACKGROUND OF THE INVENTION

A. Coke Pellets Produced According to the Present Invention Versus Slot-Oven Coke for Blast Furnace Use This invention is directed to apparatus and a method for agglomerating and controlling the size consist of an agglomerating material formed in a balling or rotating drum. More particularly, though not limiting in its application, this invention is directed to the agglomeration of carbonaceous material to form pellets of a relatively uniform size. When the pellets are formed and calcined, they may be used in place of metallurgical coke in the operation of a blast furnace. For convenience and to describe the further aspects of this invention, the description to follow will be directed to apparatus for, and a method of, forming such pellets.

Large quantities of coke are required annually by the steel industry for the manufacture of blast furnace iron, which, in turn, is converted into steel. Today, coke suitable for use in a blast furnace requires a mixture of high- and low-volatile coals (preferably having a low sulfur and low ash content) that is capable of being coked. Furthermore, such coals must be coked in slot-type by-product coke ovens, which create serious air and water pollution problems. The present invention relates to apparatus and a method for forming relatively uniformly sized pellets of carbonaceous material which may be further treated to form coke pellets having characteristics that make them suitable for use in place of slot-oven coke in a blast furnace.

The coke pellets, or agglomerates, formed by incorporating into a coke-pellet process the agglomerating method and apparatus described in the present invention have the characteristics required for satisfactory functioning in a blast furnace. That is, they supply the necessary heating value to the melting process and are strong enough to sustain the furnace burden. The pellets retain their physical integrity and resist crumbling, thereby permitting the passage of the ascending hot gases through the overlying burden.

Inasmuch as the present invention deals with the agglomerating step in a known process for making coke pellets, or agglomerates, it may be helpful to summarize the general characteristics of such process.

B. General Characteristics of Known Coke-Pellet Processes

Processes for forming coke pellets or agglomerates may be described in the following general terms:

1. Coal, which typically may comprise particulate bituminuous coal whose size is sufficient to pass through a 4 mesh screen, is preheated to just under its softening temperature before it is introduced with other constituents into an agglomerating drum. These other constituents are: (a) finely divided char that has been preheated to a temperature of about 1000°–1200° F., and, optionally, (b) pitch which functions primarily as a binder to increase the strength of the agglomerates to be formed in the agglomerating drum.

2. The mixture of these constituents—warm particulate coal, heated char, and optionally pitch—is transported into a baling or agglomerating drum. Pre-heating the coal and the two other feed constituents renders it unnecessary to have additional or supplemental heating means in the agglomerating drum. That is, the constituents contain all of the heat required to raise the temperature of the coal above its softening point and thus cause the carbonaceous materials to agglomerate.

During the agglomeration process the agglomerating drum is rotated to thoroughly mix the coal, char, and pitch and to tumble the agglomerates as they are formed. During the intimate mixing of the constituents, the temperature of the coal particles rises as they receive heat from the higher-temperature char, the result being partial distillation of the coal particles such that the agglomerate materials form a loosely coherent plastic sticky mass in the agglomerating drum. In those variations of coke-pellet processes that employ pitch as a binder, the pitch further contributes to the agglomeration of the particulate constituents within the agglomerating drum.

3. The formed agglomerates, called "green agglomerates," i.e., unhardened, which exit from the agglomerating drum would, without further processing, lack sufficient strength to sustain the heavy burden of a conventional blast furnace. Therefore, the green agglomerates are subjected to a final operation, which is a calcining treatment at temperatures between about 1350° and 1800° F. This treatment imparts sufficient strength and abrasion resistance to the pellets or agglomerates to permit their use in lieu of conventional slot-oven produced blast furnace coke.

The present invention focuses on Step 2, i.e., the forming of green agglomerates or pellets in an agglomerating (also called "balling") drum. A key feature of this invention is that the agglomerating drum and associated agglomerating method, both of which will be described herein, produce green agglomerates or pellets having a relatively uniform size. The relative uniformity of size of agglomerates is critical in insuring the successful operation of blast furnaces. In essence, the present invention achieves this desired size control of the agglomerates through the use of a plurality of spaced annular ribs located on the inside wall of the agglomerating drum that cooperate with a rotary scraping mechanism, which is within the agglomerate-forming section of the drum.

C. Prior-Art Agglomerating Drums

Having summarized the essential contribution of the present invention as the agglomerating step in coke-pellet process, let us note, for comparative purposes, the basic characteristics of prior-art agglomerating drums.

Agglomerating drums are known per se, and such structures have been employed in conjunction with scraping devices situated within the drum itself. U.S. Pat. No. 3,316,585 to Källberg contains a disclosure of the use of a rotary scraper positioned within an agglomerating drum. The scraper or scrapers are positioned within the agglomerating drum so as to remove agglomerative material from the inner wall of the drum and maintain a relatively uniform layer of the agglomerative material on the inside wall of the drum. U.S. Pat. No. 2,697,068 to Poindexter et al is another example of a combination of a rotating agglomerating drum and a rotary scraping device disposed within said drum. In each of these two patents the scraper and drum apparatus are constructed so as to maintain a uniform layer of the agglomerative material along the inner wall of the drum.

In contrast to the apparatus of such prior-art, the present invention achieves more effective balling without having to maintain a uniform layer of the agglomerative material over the full length of the durm. The ability to work with a nonuniform layer results from the use of annular ribs or dams spaced at intervals around the inside wall of the rotating agglomerating drum of the present invention. The manner in which such a drum wall configuration together with a cooperating scraping mechanism provides this ability and produces more uniformly sized balls or pellets is detailed in the specifications to follow.

SUMMARY OF THE INVENTION

The invention is directed to the apparatus and a method for agglomerating and controlling the size consist of carbonaceous material, such as particulate coal, finely divided char and, optionally, a binder such as pitch. When such carbonaceous material is heated and introduced into a rotating drum it forms into agglomerates. Control of the agglomerate consist size distribution discharged from the drum is achieved by increasing the relative residence time of the small or growing agglomerates and by limiting contact between the large formed agglomerates and the small forming or growing agglomerates. The preferred means to insure adequate growth time for the small agglomerates consists of a plurality of annular ribs spaced about the inside wall of the drum. The spaced annular ribs cooperate with a rotating scraping mechanism to maintain the radial depth of such ribs and to control the buildup of carbonaceous material between adjacent ribs. A scraping mechanism capable of achieving such results has a plurality of scraper blades projecting radially from a rotating shaft throughout the length thereof of the agglomerate-forming section of the drum. However, at the annular paths wherein a rib is found the scraping blades are shorter in length.

BRIEF DESCRIPTION OF THE DRAWINGS

FIG. 1 is a sectional view taken longitudinally through an agglomerating drum constructed according to the invention.

FIG. 2 is a full sectional view taken along the line 2—2 of FIG. 1 of an operating agglomerating drum.

FIG. 3 is a partial sectional view taken along the line 3—3 of FIG. 1.

FIG. 4 is a partial perspective view showing the inner wall configuration and cooperating scraper mechanism of the agglomerating drum of FIG. 1.

DETAILED DESCRIPTION OF PREFERRED EMBODIMENT

Agglomerating Drum

Since the critical features of the agglomerating drum of the invention are the configuration of its inner wall and the interaction of this inner wall with a scraping device, there is no need to describe mechanisms for rotating the drum and the scraping device. It is sufficient simply to point out that there are various known mechanisms for rotating the drum, e.g., the Källberg patent. The preferred operation, as shown in FIG. 2, is to have the respective rotation directions counter to one another, although direction and speed of rotation of the drum and scraping mechanism may be fixed or variable depending on the materials to be charged into the drum.

Annular Ribs

Inner wall 12 is characterized by a plurality of annular ribs 16, which are spaced, preferably at regular intervals, along the length of drum 10. Ribs 16 comprise steel rings, or the like, welded or affixed to the inner drum wall. These rings function as a dam to retard the movement of the smaller undersized agglomerates in a continuous operation from the "Feed End" to the "Discharge End" of the drum and to limit contact between the larger and smaller agglomerates being formed. While FIG. 1 shows the ribs 16 to be evenly spaced along the drum, both the number and spacing of the ribs can be varied.

Scraping Assembly

The scraping assembly 14 comprises a rotating scraper shaft 18 which is journaled in bearings 20 for rotation independent of the rotation of the drum and two sets of scraper blades 22 and 24, respectively, long and short. Scraper blades 22 and 24 are mounted and arranged along the length of shaft 18 in a plurality of rows. Typically there are four rows at right angles to one another; other possible arrangements will be noted under "Modifications to the Preferred Embodiment." The majority of the blades in each row are of the longer type, labeled 22, and, having a length denoted by "X" in FIGS. 2, 3 and 4. Likewise, the shorter blades, labeled 24, have a length denoted by "Y." The longer blades 22 are positioned along shaft 18 in such a manner as to scrape the entire inner wall 12 of drum 10 between ribs 16. Each of the longer blades may cover a separate inner wall area, but other possible arrangements will be noted later. The shorter blades are positioned to scrape the top surface of the ribs 16.

MODIFICATIONS TO THE PREFERRED EMBODIMENT

Annular Ribs

As an alternative to permanently affixed ribs to the drum inner wall, the sticky mass formed by the intimate mixing of the heated coal, char, and, optionally, pitch may be permitted to build up on the inner wall along preselected annular paths about the inner wall. Such paths would coincide with the location of the shorter scraper blades. Where such buildup about the inner wall is permitted to occur, the maximum effective depth of such built-up ribs will be limited by the difference in length between the long and short blades, i.e., by the factor $(X-Y)$.

If required, for example, to provide longer residence time of the smaller growing agglomerates, the longer scraper blades 22 can be replaced by the shorter scraper blades 24, thus permitting a buildup of the agglomerative mass at the location of the replaced blades.

Scraper Assembly

The blades 22 and 24 may be arranged in rows such that during rotation the area scraped by a given blade may overlap the scraping area of another blade of equal length, or they may work in tandem with another blade to scrape a common inner wall area. Finally, the rows of scraper blades may be arranged in helices about the shaft 18 as an alternative to the parallel arrangement shown in FIG. 1.

PREFERRED OPERATION OF INVENTION

The prime constituents added to the drum are: (1) particulate coal that has preheated to just under its softening temperature, (2) finely divided char that has been preheated to between 1000° and 1200° F., and (3) optionally, a pitch binder. While the quality of coal will generally dictate the relative quantities of constituents fed to the agglomerating drum, typically, by weight, the proportions are particulate coal 35 to 50%, char 50 to 65%, and up to 10% pitch. As a result of the preheating, tar evolves from the mixture within the drum, and the mixture becomes a loosely coherent plastic, sticky mass. A portion of this plastic sticky mass begins to adhere to the surface of the inner wall of the rotating drum. To maintain a uniform layer of the sticky mass between the annular ribs of the rotating drum, a scraping device of the type constructed according to this invention is used. With the tumbling action provided by the rotating drum and continuous removal of portions of this layer by the scraping device, said portions of the plastic particles are coalesced into even larger agglomerates. These agglomerates continue to grow until the tar that evolved from the mixture (including the pitch binder, when added as a constituent) loses its plasticity, with the result that the agglomerates become rigid or stiff and growth ceases. The time at which this plasticity is lost depends on the type of coal and the forming temperature. For most coking coals or coal mixes, the time to loss of plasticity would average 10 minutes at a forming temperature of about 820° F., with higher forming temperatures providing correspondingly shorter times.

The following describes the manner in which the scraping mechanism operates to insure: (a) an adequate residence time within the agglomerating drum for sufficient growth of the agglomerates, and (b) the limiting of constituent adherence or buildup on the inner wall to a desired depth. The longer scraper blades 22, either working with scraper blades of the same or a different row, are arranged about the scraper shaft 18 so as to cover the entire drum inner wall between adjacent ribs 16. The shorter scraper blades 24 override the ribs 16 to maintain the rib height equal to the difference between the respective lengths of scraper bladees, i.e. the relationship expressed as (X−Y). In practice, the smaller agglomerates tend to momentarily settle between such ribs as a result of the tumbling action, whereas the larger agglomerates tend to ride above the ribs.

Agglomeration could be a continuous or batch-type operation. If the operation were continuous, the larger agglomerates would be exposed to less tumbling than the smaller agglomerates as they traverse the drum, given the slight angle (1° to 2° from the horizontal) of the agglomerating drum descending from the feed end to the discharge end.

Finally, adequate rib depth must be provided in order to control the time during which the larger agglomerates are in contact with the smaller agglomerates. Otherwise, the larger agglomerates would tend to cannibalize or assimilate the smaller ones. In terms of effective action, optimum rib depth is a function of the combination of agglomerating design and operating factors that include drum size and bed depth of burden.

On the basis of experience with agglomerating drums, the flat bed depth should be about 20% of the drum diameter. When the drum is rotating the burden of growing agglomerates tends to spread out to form a concave surface (FIG. 2), thereby effectively reducing the bed depth to perhaps nearly 10% of the drum diameter. Based then on this optimum bed depth, the rib depth should be about 4 to 12% of the drum diameter. Thus, a specific value for the factor (X−Y) can be determined for a drum of a given diameter.

Once the particles have accreted and grown into agglomerates (the predominate size of which falls within a narrow range), the agglomerates are withdrawn from the rotating drum. In a continuous operation, concurrent with the removal of the already formed agglomerates, additional finely divided carbonaceous matter is fed regularly into the rotating drum to repeat the forming and growing process.

Controlling the Agglomerate Size Consist

The effectiveness of the preferred operation was demonstrated as follows. To verify the effectiveness of the ribs in controlling the agglomerate size consist to within a narrow range, a batch agglomerating study was conducted without the use of a scraper mechanism but with variations in the internal hardware.

The agglomerating tests for this study were performed in a 36-inch diameter drum:
 (a) With four rows of rakes affixed to the inner wall of the drum,
 (b) With five annular ribs having a radial depth of four inches evenly spaced about the inner wall of the drum,
 (c) Without any internal hardware, i.e., without rakes or ribs.

The size-distribution results (Table I) demonstrated that control of the formation of large agglomerates was better with the annular ribs than with rakes or without internal hardware.

TABLE I

COMPARISON OF SIZE-DISTRIBUTION CONTROL

| Internal Hardware | Average Median Size, Inches $\bar{x}$ | Average Size Deviation, Inches $\sigma$ |
|---|---|---|
| (a) Rows of Rakes | 1.38 | 0.66 |
| (b) Annular Ribs | 0.87 | 0.55 |
| (c) Without Rakes or Ribs | 1.90 | 1.04 |

Average median size determined by screen size that is exceeded by 50 weight percent of the formed agglomerates
Average size deviation determined by the difference between the median size and the screen size that exceeds the size of either 15.9 or 84.1 wt. % of the formed agglomerates i.e., 50% ± 34.1%

Using ($\sigma$) as a measure of the size distribution of agglomerates, we note: (1) without internal hardware, the agglomerate size distribution was quite large, and (2) with the annular ribs the agglomerate size distribution was lower than with the rates and much lower than when no hardware was used.

The detailed data from which Table I is derived are listed in Table II. For each test, approximately equal proportions of Kayford coal and char were used. Pitch injection was not used. With 100 pounds of feed for each run, the nominal bed depth was 7.5 inches. Drum speed was constant at 18 rpm for all tests. The forming temperature was fairly constant, varying between 783° and 810° F.

TABLE II

| | AGGLOMERATING TESTS | | | | | | | | | | |
|---|---|---|---|---|---|---|---|---|---|---|---|
| | (a) Rows of Rakes | | (b) Annular Ribs | | | | | (c) Without Rakes or Ribs | | | |
| Run | 1 | 2 | 3 | 4 | 5 | 6 | 7 | 8 | 9 | 10 | 11 |
| Feed Composition, wt.% | | | | | | | | | | | |
| Coal | 47.3 | 49.0 | 49.9 | 49.0 | 49.8 | 49.9 | 49.9 | 49.7 | 50.0 | 50.0 | 49.7 |
| Recycle Char | 52.7 | 51.0 | 50.1 | 51.0 | 50.2 | 50.1 | 50.1 | 50.3 | 50.0 | 50.0 | 50.3 |
| Forming Conditions | | | | | | | | | | | |
| Forming Time, minutes | 25 | 25 | 25 | 25 | 25 | 25 | 25 | 25 | 25 | 25 | 25 |
| Forming Temp., °F. (at 5 min.) | 800 | 794 | 783 | 810 | 786 | 790 | 790 | 786 | 788 | 789 | 785 |
| Coal Preheat Temp., °F. | 608 | 611 | 611 | 607 | 610 | 611 | 610 | 610 | 611 | 611 | 615 |
| Char Preheat Temp., °F. | 1123 | 1117 | 1120 | 1120 | 1119 | 1120 | 1120 | 1120 | 1120 | 1120 | 1125 |
| Coke Pellet Size Distribution, wt. % | | | | | | | | | | | |
| −5" +4" | 0.0 | 0.0 | 12.8 | 0.0 | 0.0 | 0.0 | 0.0 | 48.8 | 0.0 | 0.0 | 0.0 |
| −4" +3" | 0.0 | 0.0 | 2.4 | 0.0 | 0.0 | 0.0 | 0.0 | 13.1 | 1.7 | 3.5 | 2.9 |
| −3" +2" | 7.9 | 23.5 | 21.7 | 3.4 | 4.1 | 4.3 | 0.4 | 7.6 | 5.2 | 34.0 | 14.8 |
| −2" +1½" | 16.9 | 35.2 | 18.5 | 6.4 | 13.0 | 9.1 | 3.8 | 9.5 | 13.0 | 30.0 | 24.5 |
| −1½" +1" | 32.4 | 26.3 | 21.7 | 14.2 | 26.8 | 24.9 | 14.1 | 10.3 | 17.6 | 20.8 | 30.5 |
| −1" +¾" | 11.4 | 8.0 | 11.3 | 15.3 | 18.0 | 19.0 | 15.5 | 3.2 | 25.3 | 6.5 | 13.8 |
| −¾" | 31.4 | 6.0 | 11.6 | 60.7 | 38.1 | 42.7 | 66.2 | 7.5 | 37.2 | 5.2 | 13.5 |
| −2" +¾" | 60.7 | 69.5 | 51.5 | 35.9 | 57.8 | 53.0 | 33.4 | 23.0 | 55.9 | 57.3 | 68.8 |
| x̄, Median Size, inches | 1.15 | 1.60 | 1.65 | 0.50 | 0.90 | .080 | 0.50 | 3.4 | 1.0 | 1.75 | 1.45 |
| σ, Deviation of Size, inches | 0.72 | 0.60 | 0.40 | 0.75 | 0.30 | 0.70 | 0.60 | 2.4 | 0.70 | 0.75 | 0.70 |

With the primary problem of control of agglomerate size distribution taken care of by this invention, the worker skilled in the art is free to focus his attention on other known concepts to develop the specific agglomerate size desired. For example, the presence of rakes tends to diminish the formation of the larger agglomerates, thereby permitting the continual growth of smaller agglomerates. Other variables known to affect the agglomerate size of formed coke are: bed depth, forming temperatures, amount of pitch addition, and coal concentration in the feed. Such information in combination with the application of this invention results in the production of a consistently sized agglomerate suitable for industrial purposes, e.g., formed coke for the steel industry's blast furnaces.

I claim:

1. Agglomerating apparatus to control the size of carbonaceous material formed into agglomerates in a drum, comprising:
    (a) a drum rotatable about a central axis thereof, an exposed inner wall of said drum uniformly spaced from said axis throughout the length of said drum, and feed and discharge means for introducing and removing material therefrom,
    (b) a plurality of raised annular ribs affixed to said inner wall,
    (c) a rotating shaft extending into said drum, and offset from said central axis of said drum,
    (d) a plurality of scraper blades projecting from said shaft, where a predetermined number of said scraper blades are of a given length and adapted to scrape accumulated carbonaceous material from said inner wall of said drum when said drum and shaft are rotated, and
    (e) the remainder of said scraper blades having a lesser length, whereby said blades of a lesser length are interposed between said blades of a given length so as to scrape accumulated carbonaceous material from the top portion of said annular ribs about said inner wall.

2. The apparatus according to claim 1, wherein said annular ribs are formed by accumulated carbonaceous material within the respective planes formed by each of said scraper blades of a lesser length as said scraper blades of a lesser length rotate.

3. The apparatus according to claim 1, wherein the raised annular ribs have a depth equal to about 4% to 12% of the diameter of said rotatable drum.

4. The apparatus according to claim 1, wherein there are a plurality of angularly spaced rows of scraper blades about said rotating shaft, each row containing scraper blades of said given length and said lesser length.

5. The apparatus according to claim 4, wherein said rows are parallel to the axis of said rotating shaft.

6. The apparatus according to claim 4 wherein said rows are arranged in helices about said rotating shaft.

* * * * *